United States Patent
Modlin

(10) Patent No.: US 7,457,993 B2
(45) Date of Patent: Nov. 25, 2008

(54) ERROR FREE DYNAMIC RATE CHANGE IN A DIGITAL SUBSCRIBER LINE DSL WITH CONSTANT DELAY

(75) Inventor: Cory S. Modlin, Chevy Chase, MD (US)

(73) Assignee: Texas Instruments Incorporated, Dallas, TX (US)

( * ) Notice: Subject to any disclaimer, the term of this patent is extended or adjusted under 35 U.S.C. 154(b) by 368 days.

(21) Appl. No.: 11/274,283

(22) Filed: Nov. 16, 2005

(65) Prior Publication Data

US 2006/0150059 A1    Jul. 6, 2006

Related U.S. Application Data

(60) Provisional application No. 60/628,884, filed on Nov. 16, 2004.

(51) Int. Cl.
  *G06F 11/00* (2006.01)
  *H03M 13/00* (2006.01)
(52) U.S. Cl. ........................... 714/701; 714/755
(58) Field of Classification Search ............... 714/701, 714/755
  See application file for complete search history.

(56) References Cited

U.S. PATENT DOCUMENTS

| 4,559,625 | A | 12/1985 | Berlekamp et al. |
| 5,469,851 | A | 11/1995 | Lipschutz |
| 5,579,277 | A | 11/1996 | Kelly |
| 5,764,649 | A | 6/1998 | Tong |
| 6,408,367 | B2 | 6/2002 | Achilles et al. |
| 6,484,283 | B2 | 11/2002 | Stephen et al. |
| 6,701,419 | B2 | 3/2004 | Tomaiuolo et al. |
| 6,922,444 | B1 * | 7/2005 | Cai et al. .................... 375/260 |
| 7,225,306 | B2 | 5/2007 | Tong |
| 2005/0094677 | A1 * | 5/2005 | Lu et al. .................... 370/535 |

FOREIGN PATENT DOCUMENTS

EP   0681373 A2   11/1995

OTHER PUBLICATIONS

Forney, G.D., "Burst-Correcting Codes for the Classic Bursty Channel," IEEE Transactions on Communication Technology, IEEE, Inc., New York, U.S., vol. 19, No. 5, Oct. 1, 1971, pp. 772-781.
Ramsey, J.L., "Realization of Optimum Interleaves," IEEE Transaction on Information Theory, IEEE Inc., New York, US, vol. 16, No. 3, May 1, 1970, pp. 338-345.

* cited by examiner

*Primary Examiner*—James C Kerveros
(74) *Attorney, Agent, or Firm*—Steven A. Shaw; W. James Brady; Frederick J. Telecky, Jr.

(57) ABSTRACT

A method for changing the data rate over an interleaved latency path overcomes shortfalls of the ADSL2 seamless rate adaptation (SRA) and dynamic rate repartitioning (DRR). The interleaver depth is allowed to change during either a rate charge or rate repartitioning so that the interleaver delay is constant before and after the change. The transmitter pauses its transmission for a time approximately equal to the delay of the interleaver so that there are approximately no errors introduced at the receiver.

12 Claims, 2 Drawing Sheets

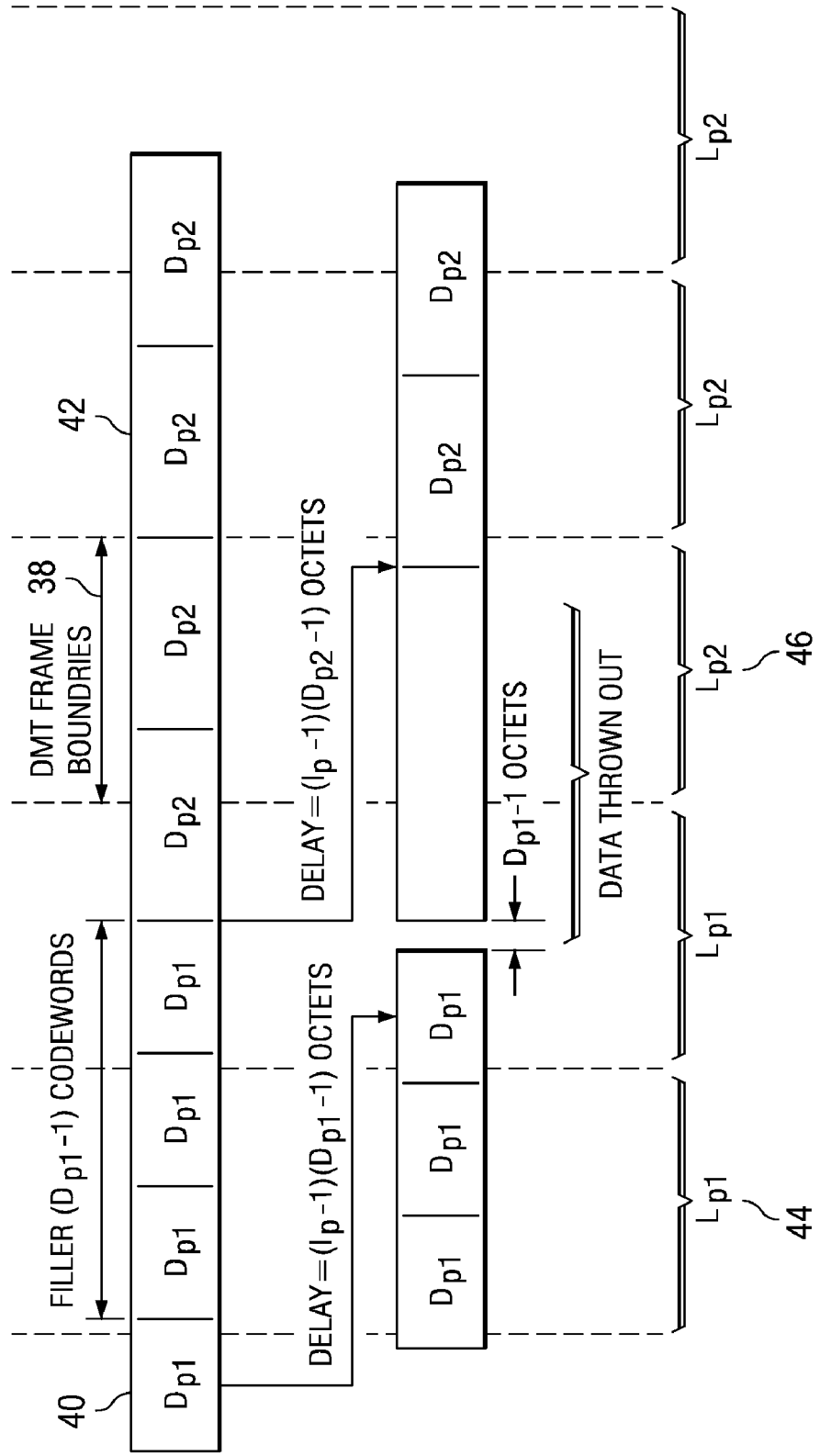

ERROR FREE DYNAMIC RATE CHANGE IN A DIGITAL SUBSCRIBER LINE DSL WITH CONSTANT DELAY

CROSS-REFERENCE TO RELATED APPLICATIONS

This application claims the benefit of U.S. Provisional Patent Application No. 60/628,884 filed Nov. 16, 2004.

FIELD OF THE INVENTION

This invention relates generally to a method for changing the data transmission rates on a digital subscriber line (DSL) system, and more specifically changing or enhancing the data rate on a DSL system, such as a system capable of carrying voice, video, and Internet traffic.

BACKGROUND OF THE INVENTION

Recently, there has been discussion about dynamic rate repartitioning (DRR) and seamless rate adaptation (SRA) and whether or not true seamlessness is really required or desirable. DRR refers to the capability to transfer data rate bandwidth between two bearer channels without changing the aggregate data rate. SRA refers to the capability to change the aggregate data rate.

DRR is often envisioned for the combined delivery of video and internet traffic on two latency paths. It is not desirable to put Internet traffic on an interleaved latency path because the delay slows the TCP/IP throughput and affects applications like gaming or video conferencing. Video traffic is very sensitive to impulse errors but not sensitive to delay and therefore using the interleaved path is appropriate. As video channels are switched on (off), bandwidth can be switched from (to) the fast latency path to (from) the interleaved latency path. For example, if there is more than one television, then it is desirable that switching one television on or off does not disturb the picture on another television. This is the primary motivation for a seamless DRR procedure.

Similarly with SRA, a subscriber might want to pay extra for a temporary increase in bandwidth. This subscriber would expect that the increase in charges would result in service that did not suffer delays and interruptions.

An interleaver/deinterleaver is a pair of building blocks normally used in a digital control and communication system to increase the stability of the system. In general, interleaving spreads the consecutive burst errors introduced into the system to many non-consecutive places so that errors may be easily detected or corrected by, for example, a forward error control (FEC) coding block. The interleaver and deinterleaver may be used together with Reed Solomon FEC code to combat the impulse noise on a twisted pair telephone line.

The current SRA and DRR in ADSL2 (Asychronous Digital Subscriber Line 2) is referred to as "seamless" but, when the interleaver is enabled, has a number of limitations and is not truly seamless. In ADSL2, an SRA or DRR is accomplished with an on-line reconfiguration (OLR) message. During an SRA or DRR, the bits and gains ($b_i$, $g_i$) can be changed as well as the number of bits in a DMT frame, $L_p$ for latency path p. When the interleaver is enabled, the interleaver depth or codeword size can not be changed. Interleaver depth is defined as the quantity codewords stored in the interleaver's memory. Increasing the interleaver depth provides greater protection from bursts of noise in a DSL line. ADSL2 specifications are described in the International Telecommunications (ITU-T) G.992.3 Recommendation "Asymmetric Digital Subscriber Line (ADSL) transceivers 2," which is incorporated by reference.

The delay through the interleaver and deinterleaver pair is $$\text{interleaver delay} = 8 \cdot (N_{FEC,p}-1)(D_p-1)/(4 \cdot L_p) \text{ ms}$$

where $N_{FEC,p}$ is the Reed-Solomon codeword size and $D_p$ is the interleaver depth. The interleaver delay is inversely proportional to the number of bits carried in the latency path. For example, if the interleaver delay is 10 ms at a certain data rate with two video streams and a television is switched off, the interleaver delay would jump immediately to 20 ms if the data rate were cut in half. Depending on how the video buffering is done, this jump in latency may cause a momentary disruption in the picture and so it is not truly seamless.

Problems associated with an increase or decrease in the interleaver delay include:

- an instant change in delay that could be registered as momentary disruption;
- the period of the overhead channel in ADSL2 will fall out of the 15-20 ms range and violate the requirements of the recommendation;
- a rate of the overhead channel changes in proportion to the change in data rate;
- interleaver delay could exceed bounds required by the operator as the data rate is reduced;
- for bonding, data rate must be changed on all bonded modems in exactly the same ratio to maintain the same buffering requirements and approximately and the same differential delay;
- impulse noise protection, which can be written as $8*D_p*t_p/L_p$ (DMT frames) where $t_p$ is the correction capability of the Reed-Solomon code, will change inversely proportional to the data rate change causing a possible change in the perceived picture quality; and
- TCP/IP throughput performance will change True seamless rate change would mean no interruption in data and no change in the delay or perceived quality of the data stream. As the data rate changes, the way to achieve true seamless behavior when the interleaver is enabled is to change the interleaver depth in proportion to the data rate, as in equation (1), so that the overall delay remains constant. Because the codeword size does not change, the coding gain remains constant as does the immunity to impulse noise.

The problem is, when the interleaver depth changes, it is very difficult to structure things in a way that causes no interruption in data and no errors. Different vendors use different algorithms and memory structures to implement interleavers. All implementations, if done properly, result in the same output stream. But if the interleaver depth changes in the middle of the stream, it is very unlikely that two interleaver implementations will produce the same output during a transition period equal to the total end-to-end delay of the interleaver and deinterleaver. Even for a single implementation, the sequence of the output stream after a change in the interleaver depth can change depending on when the transition is made.

In the ADSL2 SRA and DRR schemes, the interleaver size remains constant meaning that the overall delay, impulse noise protection, overhead rate, and overhead period all change in proportion to the change in data rate. Thus, in a DSL system carrying voice, video, and or internet traffic, there is a desire among operators to be able to change the data rate or change the bandwidth allocation between high and low latency paths with minimal or no interruption in service. One solution (currently used in ADSL2) changes only the number of bits carried in each DMT frame but does not change the interleaver depth.

SUMMARY OF THE INVENTION

The preferred embodiment includes a method for changing the data rate over an interleaved latency path overcomes shortfalls of the ADSL2 seamless rate adaptation (SRA) and dynamic rate repartitioning (DRR). For interleaved data, the interleaver depth is changed so that the interleaver delay is approximately equal before and after the transmission rate change. There will be a break in data transmission that will last for a time roughly equal to the interleaver delay. This way there are no receiver errors.

In ADSL2 there is a DRR Dynamic Rate Repartitioning and an SRA Seamless Rate Adaptation. These are defined but only work on the fast path (e.g., the path without the interleaver) if used. If they are used with the interleaver, the interleaver depth is not actually changed. If the data rate is changed then the delay is changed, resulting in undesirable changes in the impulse noise properties and the delay. The delay should to be constant because applications run on a broadband IP network over IP depend on the delay. So it was widely recognize that the method in ADSL2 was not going to work for the interleaver path. In ADSL2 operators concluded interleaving was necessary. Thus, there was a desire to be able to change the data rate on the fly without restarting, but keeping the delay the same.

The preferred embodiment changes the interleaver depth during either a rate change or rate repartitioning so that the interleaver delay is constant before and after the change. The transmitter pauses its transmission for a time approximately equal to the delay of the interleaver so that there are no errors introduced at the receiver. A typical interleaver delay is on the order of five to ten milliseconds. The preferred method performs steps of stopping transmission, draining the interleaver, and as soon as it is drained, let the interleaver fill up again. This procedure provides an interruption equal to the interleaver delay, which is typically five to ten milliseconds.

In the current method, the transmitter and receiver need to be coordinated to prevent errors. At some point in time of transmission, the transmitter data stream stops but the data continues to flow over the channel. Since the data is interleaved, some of that data is invalid while some is the interleaved valid data. At the same time, the receiver needs awareness of procedures of draining and changing the interleaver depth in order to continue to receive until the interleaver has drained the final byte of data out of the interleaver. The interleaver then starts again at the new depth, but the receiver waits to throw away the invalid data to prevent any errors at the receiver. The receiver needs to be coordinated with this procedure so that when it receives the invalid data, it discards the invalid data during the interruption time.

BRIEF DESCRIPTION OF THE DRAWINGS

For a better understanding of the nature of the present invention, its features and advantages, the subsequent detailed description is presented in connection with accompanying drawings in which:

FIG. 3 illustrates data frames of a transmission changing the interleaver depth on an ADSL line.

DETAILED DESCRIPTION OF THE INVENTION

The preferred exemplary embodiment of the present invention includes a method with no errors for changing the data rate in Asynchronous Digital Subscriber Line 2 (ADSL2) seamless rate adaptation (SRA) and dynamic rate repartitioning (DRR) schemes for data transmission.

Figure 1:
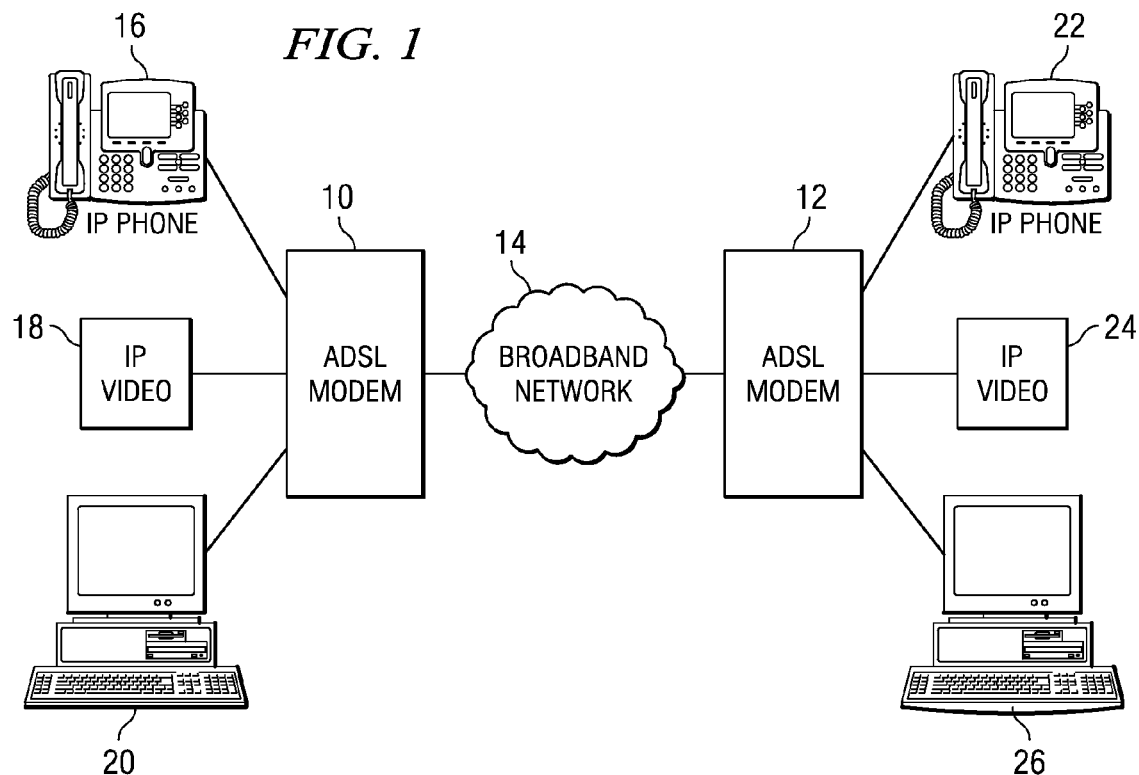
FIG. 1 illustrates a conventional network including ADSL modems.

FIG. 1 illustrates a conventional ADSL system capable of transmitting voice, video, and data over a broadband network 14 between a ADSL modem 10 and ADSL modem 12. While both ADSL modems 10 and 12 contains transmitters and receivers that transmit and receive data signals, for the purposes of illustrating the preferred embodiment, ADSL modem 10 is described as a transmitter and ADSL modem 12 is describes as a receiver. ADSL modem 10 is connected over network lines to Internet Protocol (IP) phone 16, IP video device 18, and/or a computer (PC) 20 and handles transmissions for these devices over network 14. Similarly, ADSL modem 12 is connected to IP phone 22, IP video device 24, and/or a computer 26 and handles transmissions for these devices over network 14.

To both enhance the capabilities of DRR and SRA with respect to ADSL2 and to avoid the complexity of doing a truly seamless rate change, we advocate an "error free" rate adaptation. In an error free rate change, we change the interleaver depth in proportion to the rate change. To prevent errors, we interrupt the data stream for a length of time approximately equal to the end-to-end delay of the interleaver (typically on the order of between 5 and 20 ms).

Preventing errors in the interleaver has the desired effect of preventing synchronization errors in higher layers—the ATM-TC or EFM-TC for example. Synchronization errors in the ATM-TC or EFM-TC can add to the time it takes to recover from an interruption since these TCs need to search for the beginning of a 65 octet codeword or 53 octet cell. And, if ATM header compression is used, it is imperative that sync not be lost.

For a transition from $L_{p1}$ to $L_{p2}$ bits per frame, the preferred embodiment selects a new interleaver depth, $D_{p2}$, so that $$\frac{(D_{p1}-1)}{L_{p1}} = \frac{(D_{p2}-1)}{L_{p2}}.$$

With a generalized convolutional interleaver (GCI), there is sufficient granularity in interleaver depth to allow a full range of rate changes.

Figure 2:
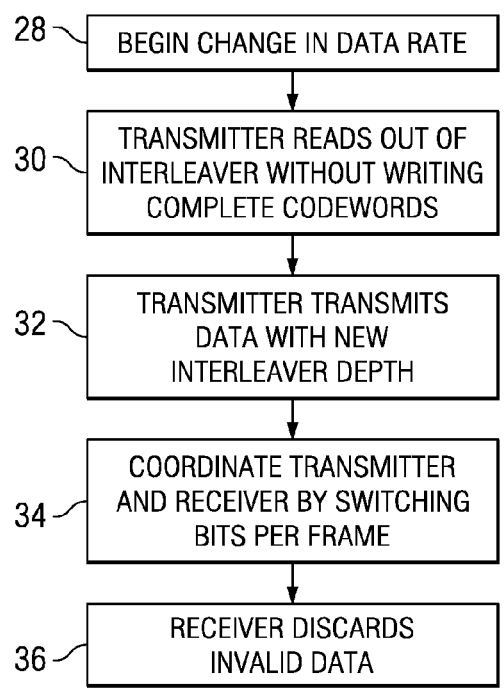
FIG. 2 illustrates a method of the preferred embodiment.

Referring to the flowchart in FIG. 2 and the data frame transmission diagram in FIG. 3, step 28 describes that a change of interleaver depth begins while the transmitter 10 and receiver 12 start a change in data rate on the same DMT frame (e.g., frame 38). In FIG. 3, $D_{p1}$ (40) are codewords in transmission at a first interleaver depth and first bits per frame size, and $D_{p2}$ (42) are codewords in transmission at a second interleaver depth and a second bits per framesize. Flowchart step 30 describes the next step 30, where starting with the first complete codeword that begins after start of this DMT frame, the transmitter 10 reads out of the interleaver, but does not process or write, $(D_{p1}-1)$ complete codewords; this is equivalent to inserting $(D_{p1}-1)$ filler codewords into the interleaver. In this step, that transitions the interleaver depth from $D_{p1}$ to $D_{p2}$, the preferred method is used to "flush" the data out of the interleaver. This is performed by reading data out of the interleaver without writing data into the interleaver, or equivalently, by writing filler data into the interleaver. As illustrated in FIG. 3, the end-to-end interleaver delay is ($D_{p1}-1$)($I_p-1$) octets where $I_p$ is the length of the VDSL interleaver. A VDSL interleaver is a generalized form of the ADSL2 interleaver where $I_p=N_{FEC,p}/q$ where q is an integer. All of the previous discussion about the ADSL2 interleaver with length $N_{FEC,p}$ also applies to the VDSL interleaver with length $I_p$. In order to completely flush out the interleaver, at least this number of octets needs to be written. In order to insure that operations are on a codeword boundary, ($D_{p1}-1$)($I_p$) octets are flushed out of the interleaver. This represents a break in the data stream equal to approximately the end-to-end delay of the interleaver.

In step 32, the transmitter begins transmitting data again with the interleaver depth set to $D_{p2}$ starting with the very next codeword after the last codewords are flushed from the interleaver.

The transmitter 10 and receiver 12 need to be coordinated to eliminate errors during the transition. At some point in time during the transmission, the transmitter data stream stops but the data remains in continual transmission over the channel. Because the data stream is interleaved, some of the transmission is invalid data that has been interleaved with valid data. In step 34, the preferred embodiment uses one of many possible methods to coordinate the transmitter and receiver. Here, at the next DMT frame boundary after the ($D_{p1}-1$) complete codewords are written into the interleaver, the number of bits per DMT frame is transitioned from $L_{p1}$ (44) to $L_{p2}$ bits per frame 46.

In the final step 36 shown in FIG. 2, the receiver discards all invalid data from the interleaved data stream. After the transmitter starts transmitting the $D_{p1}-1$ filler codewords, the receiver will receive ($D_{p1}-1$)($I_p-1$) octets more while the interleaver is being flushed. Then, because the transmitter switches to the new interleaver on a codeword boundary, there are $D_{p1}-1$ additional octets using the interleaver depth $D_{p1}$. After the $D_{p1}-1$ additional octets, the receiver switches to the new interleaver with depth $D_{p2}$. ($D_{p2}-1$)($I_p-1$) octets later it will receive the first valid octet out of the new interleaver.

In another embodiment, it is also possible to change the interleaver depth without changing the data rate. In this alternative, the delay will change, which could be registered as a momentary disruption. One reason for using this alternative method is to change the impulse noise protection. The same procedure can be used. The only difference is that the interruption in data will be equal to the interleaver delay using the higher interleaver depth.

The embodiments of the present invention can be applied to any dynamic rate change procedure for ADSL2 that involves the interleaved path. The present rate change procedure allows the interleaver depth to change so that the interleaver delay before and after the rate change are nearly equal, resulting in consistent impulse noise protection and overhead rate. A change of rate also results in a short break in the data stream, where the length of the break is approximately equal to the end-to-end interleaver delay.

One skilled in the art will appreciate that the present invention can be practiced by other than the described embodiments, which are presented for purposes of illustration and not limitation, and the present invention is limited only by the claims that follow.

What is claimed is:

1. A method for data transmission rate change for a digital subscriber line (DSL) transmission, comprising:
reading out an interleaver without writing complete codewords;
changing seamlessly the interleaver depth on an interleaved data path while transmitting a data stream with the changed interleaver depth;
coordinating a transmitter and a receiver by switching bits per frame; and
discarding invalid data at the receiver after changing the interleaver depth.

2. The method of claim 1, wherein an end-to-end delay between said receiver and said transmitter is maintained approximately constant before and after the rate change.

3. The method of claim 1, further comprising:
providing a break in the data stream, wherein the break has a length approximately equal to a delay of the interleaver.

4. The method of claim 1, changing an end-to-end delay before and after the rate change to effect a change in an impulse noise protection.

5. The method of claim 1, wherein the changing the interleaver depth comprises draining the interleaver by continuing to reading data out of the interleaver while not adding new data to the interleaver before the change in interleaver depth.

6. The method of claim 5, wherein the draining the interleaver comprises inserting at least (D−1)*(I−1) octets in the data transmission to drain the interleaver, wherein D is an initial interleaver depth and I is an initial interleaver length.

7. The method of claim 6, wherein the inserting comprises draining the interleaver and ending on a codeword boundary by inserting D−1 complete codewords.

8. The method of claim 7, wherein changing the interleaver depth is immediately done after a plurality of complete codewords are inserted.

9. The method of claim 7, further comprising:
switching to a new number of bits per DMT frame on a next frame boundary after the complete codewords are inserted.

10. The method of claim 1, wherein the discarding comprises discarding the invalid data after waiting exactly (D−1)*(I−1) octets until a deinterleaver is primed, wherein D is a new interleaver depth and I is a new interleaver length.

11. The method of claim 1, wherein the changing comprises maintaining an approximately constant end-to-end delay before and after the rate change.

12. The method of claim 1, wherein the changing comprises increasing or decreasing the impulse noise protection.

* * * * *